W. D. HALE.
AUTOMOBILE BED.
APPLICATION FILED JUNE 5, 1919.
1,365,035.
Patented Jan. 11, 1921.
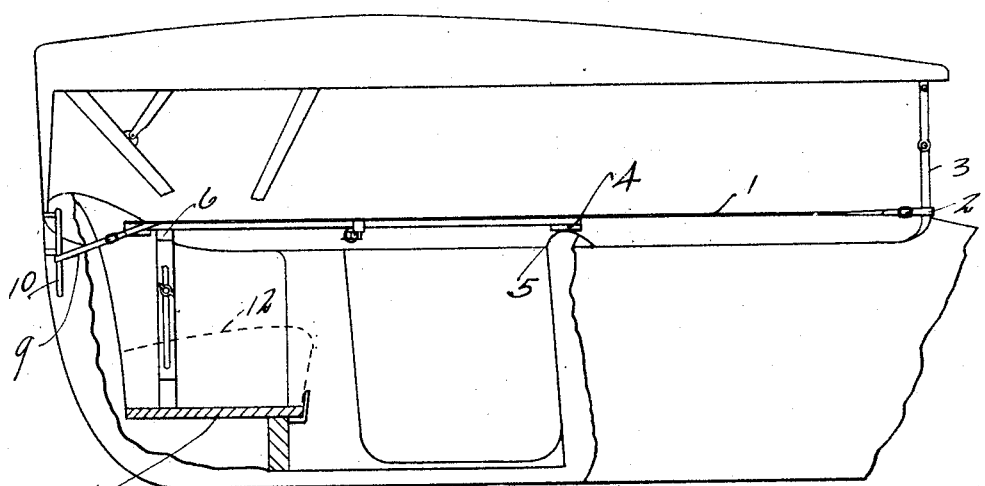
Fig. 1.
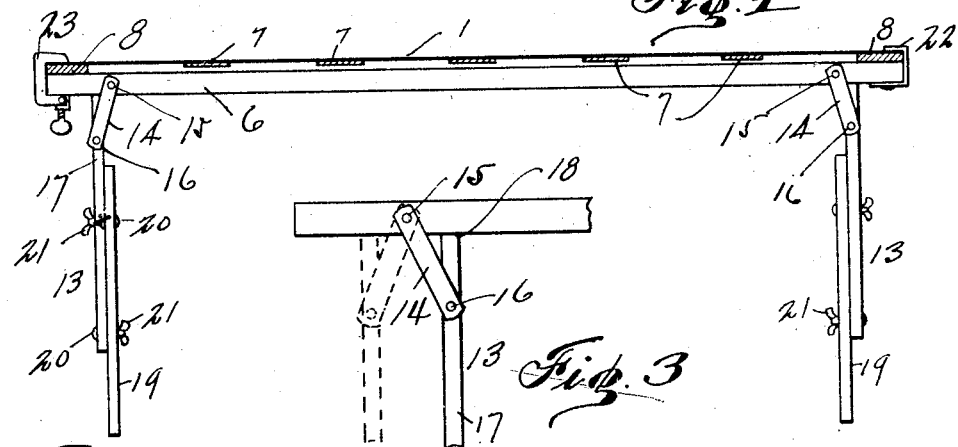
Fig. 2.
Fig. 3.
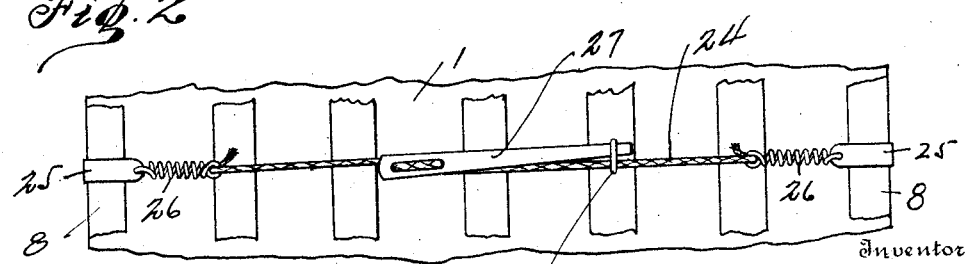
Fig. 4.
Inventor
William D. Hale
By
Herbert E. Smith
Attorney

UNITED STATES PATENT OFFICE.

WILLIAM D. HALE, OF SPOKANE, WASHINGTON.

AUTOMOBILE-BED.

1,365,035. Specification of Letters Patent. Patented Jan. 11, 1921.

Application filed June 5, 1919. Serial No. 301,869.

*To all whom it may concern:*

Be it known that I, WILLIAM D. HALE, a citizen of the United States, residing at Spokane, in the county of Spokane and State of Washington, have invented certain new and useful Improvements in Automobile-Beds, of which the following is a specification.

The present invention relates to improvements in automobile beds, of the type illustrated in Patent No. 1,199,481, September 26, 1916, and this present invention involves features and constructions combined with the structure of the patented bed enhancing its adjustability and adaptability, and rendering the improved structure convenient and facile in use, and adding to its comfort and stability when mounted in the automobile.

By the utilization of the present invention a foldable and flexible bed is provided with features adapting it especially applicable for use with seven passenger type of touring car, and the essence of the invention resides in the improved form of rear support for the bed used in connection with the rear seat box or bottom, of the car, and in certain novel combinations and arrangements of parts as will be hereinafter more fully set forth.

In the accompanying drawings one complete example of the physical embodiment of the invention is illustrated, the parts being combined and arranged according to the best mode so far devised for the practical application of the principles of the invention.

Figure 1 is a view showing so much of an automobile of usual type as is necessary to illustrate the application thereto of the invention.

Fig. 2 is a transverse section of the rear, slatted, portion of the bed.

Fig. 3 is a detail view showing the connection of one of the rear legs to the side bar or frame of the bed.

Fig. 4 is a plan, at the underside, of a part of the slatted portion of the bed, showing a transverse reinforcing or tension member for the bed.

The body of the bed is constituted of a sheet of fabric 1, of canvas or other suitable material of proper size and strength and shaped as required, the formation being rectangular for suspension under the cover or top of the automobile, and the foot of the bed, is secured by corner straps or fasteners 2 to the wind shield posts or cover posts 3 at the front of the car. An intermediate transverse cleat 4 is provided to rest upon the top of the seat back 5 of the front seat of the car and the rear, parallel transverse bar 6, together with this intermediate transverse bar or cleat form the support for the longitudinally extending slats 7, 7. The intermediate bar and the rear bar are connected at their ends by the side bars 8, 8 of the slatted portion of the bed, somewhat thicker and heavier than the intermediate slats, and at the rear corners, the body 1 of the bed is secured by fasteners 9 in the form of straps to the automobile top clamps 10 at the back of the automobile. The bed is thus suspended above the seats of the car, from its four corners, and is supported intermediate its ends by the transverse cleat 4 resting on the top of the front seat, and the corner fastenings, in the form of straps, may be adjusted with facility and convenience to properly support the fabric body of the bed, and hold it taut.

The slatted portion of the bed which sustains the major portion of the weight of the sleeper, is supported from the back portion of the front seat, and is also supported by box of the back or rear seat 11, after the upholstery or cushion 12 (dotted lines Fig. 1) is removed, through the instrumentality of a pair of pivoted and extensible legs 13, 13, depending from the rear cross bar 6. These legs may be of wood, and are jointed to the rear cross bar by a metal strap or plate 14 pivoted to the bar at 15, and at 16 pivoted to upper section 17 of the extensible leg 13. The legs may be adjusted laterally or transversely of the car through the adjustability of the link or plate 14, as indicated in dotted lines Fig. 3, and the squared upper end 18 of the upper section fits up snug and flush with the under face of the rear cross bar, so that when the load is on the cross bar and leg, the weight thereof will hold the leg and link in rigid and stable relationship with the cross bar. By this arrangement the space between the legs may be increased or diminished to adapt the supporting legs to different widths of cars, and yet maintain a rigid and stable support for the bed. The lower section 19 of each leg is secured in adjusted position with relation to the upper section by the set screws 20 and wing nuts 21 for clamping the parts together, and by these devices the bed may be adjusted for altitude and to adapt it for use with varying heights of rear seats of cars.

The extensible and adjustable legs are permanently connected with the cross bar 6 and may be folded thereon when the bed is being packed for storage or transportation, and the bed or flexible body 1 is detachably secured to the rear cross bar 6 in such manner that the cross bar with its foldable legs may be readily detached therefrom. To this end the cross bar 6 is provided with a fixed hook 22 in which the end slat and the end of the cross bar will fit tightly, and the other end of the bar 6 is equipped with a screw clamp 23 which may be first loosely applied to the end slat at the opposite side of the bed body and then by turning its screw the slat and bar are firmly secured or clamped together as in Fig. 2. In this manner the bed 1 is held extended transversely at its head and firmly supported above the extended legs. An additional brace and tension device is provided between the two supporting members 4 and 6 of the bed to prevent sagging of the canvas. This device includes a rope or cord 24 having at each end a hook 25 and a spring 26, the former adapted to snap over the outside slats or side bars 8 8, and the latter adding resiliency and tension to the device. For taking up the slack and pulling the parts taut, and at the same time providing a rigid support midway of the canvas fabric, a lever 27 is provided, which has two holes near its larger end through which the rope or cord 24 passes, the end going through the right hole passing to the left and the end passing through left hole passing to the right in Fig. 4, where the lever is turned to taut position, and held by the ring 28 as shown. As shown the lever is turned down parallel with the rope and the length of rope is shortened. By sliding the ring 28 to the right, the lever, or rather its free end will be loosened, and it may then be turned up to right angles with the rope, thus loosening it, and enabling the hooks 25 to be detached from the side bar.

The presence of the lever, supported at both ends by the rope provides a rigid central support for the fabric and the bed is devoid of an uncomfortable and inconvenient depression in its center.

From the above description taken in connection with the drawings it is evident that the foldable bed is specially adapted for touring cars, when the tourist is required to sleep in the car, and that the bed may be quickly and with facility slung or hung in place, and should the car be less than the seven passenger style or type and narrower through the body, the extensible and adjustable legs at the ends of the rear cross bar may be adapted, within limits, to any width as described, and the slotted sections of the extensible legs permit the legs to be adjusted as to altitude to conform to the particular seat or box in the car being used.

When not in use the extensible legs are folded on the rear cross bar, and the flexible body of the bed is folded or wrapped into small compass for packing or storing.

What is claimed herein is—

1. The combination of a flexible bed having an end cross bar and supporting devices, of a pair of foldable, vertically extensible legs, a pair of pivot links on the bar connecting each leg with the bar near its ends, whereby the legs may be adjusted laterally of the bed and engage under the bar at either side of the pivot center for supporting the bar.

2. The combination in an automobile bed of a flexible body suspended at the front of the automobile, a supporting bar at the rear of the automobile and detachable means for securing said bed and bar, an intermediate supporting bar for the bed adapted to rest on a portion of the automobile, a pair of vertically adjustable legs adapted to stand on the rear seat of the automobile, and a pair of links pivoted to the legs and to the bar near its ends whereby the legs may be adjusted transversely of the car and support the rear bar in adjusted position.

In testimony whereof I affix my signature.

WILLIAM D. HALE.